United States Patent
Yasuda et al.

(10) Patent No.: US 10,300,572 B2
(45) Date of Patent: May 28, 2019

(54) WORKPIECE LOADER DEVICE

(71) Applicant: DMG MORI CO., LTD., Nara (JP)

(72) Inventors: Hiroshi Yasuda, Nara (JP); Yoshinobu Okuyama, Nara (JP); Takayuki Higuchi, Nara (JP)

(73) Assignee: DMG MORI CO., LTD., Yamatokoriyama-Shi, Nara (JP)

( * ) Notice: Subject to any disclaimer, the term of this patent is extended or adjusted under 35 U.S.C. 154(b) by 4 days.

(21) Appl. No.: 15/562,662

(22) PCT Filed: Mar. 7, 2016

(86) PCT No.: PCT/JP2016/056987
§ 371 (c)(1),
(2) Date: Sep. 28, 2017

(87) PCT Pub. No.: WO2016/158218
PCT Pub. Date: Oct. 6, 2016

(65) Prior Publication Data
US 2018/0104781 A1    Apr. 19, 2018

(30) Foreign Application Priority Data
Mar. 31, 2015  (JP) ................. 2015-072171

(51) Int. Cl.
*G05B 19/18* (2006.01)
*B23Q 7/04* (2006.01)
(Continued)

(52) U.S. Cl.
CPC ............. *B23Q 7/045* (2013.01); *B23Q 1/626* (2013.01); *B23Q 7/04* (2013.01); *B23Q 7/046* (2013.01);
(Continued)

(58) Field of Classification Search
CPC .......... B23Q 7/045; B23Q 7/046; B25J 9/023; G05B 19/423; G05B 2219/36492; G05B 2219/36425
(Continued)

(56) References Cited

U.S. PATENT DOCUMENTS

| 6,022,132 A | 2/2000 | Schulz |
| 6,338,024 B1 * | 1/2002 | Taniguchi ............ B23Q 17/12 318/560 |

(Continued)

FOREIGN PATENT DOCUMENTS

| JP | 63-120307 A | 5/1988 |
| JP | 2-58107 A | 2/1990 |

(Continued)

OTHER PUBLICATIONS

JP 03218502 A, Murata Mach LTD, Skiya Hiroyuki (English Machine translation attached).*

(Continued)

*Primary Examiner* — Eduardo Colon Santana
*Assistant Examiner* — Gabriel Agared
(74) *Attorney, Agent, or Firm* — IP Business Solutions, LLC (57) ABSTRACT

In a workpiece loader device, a loader mechanism is configured to move a loader hand directly held by operator's hands to a desired position. A loader mechanism control part stores position coordinates as workpiece receiving position coordinates when the loader hand is moved by operator's hands to the workpiece receiving position and a completion of moving is confirmed.

4 Claims, 5 Drawing Sheets

(51) Int. Cl.
  *B25J 9/02*      (2006.01)
  *G05B 19/423*    (2006.01)
  *B25J 9/00*      (2006.01)
  *B25J 9/16*      (2006.01)
  *B25J 13/02*     (2006.01)
  *B25J 13/08*     (2006.01)
  *B25J 15/02*     (2006.01)
  *B23Q 1/62*      (2006.01)

(52) U.S. Cl.
  CPC ............. *B25J 9/0081* (2013.01); *B25J 9/023* (2013.01); *B25J 9/026* (2013.01); *B25J 9/1633* (2013.01); *B25J 9/1664* (2013.01); *B25J 13/02* (2013.01); *B25J 13/08* (2013.01); *B25J 15/0253* (2013.01); *G05B 19/423* (2013.01); *G05B 2219/36425* (2013.01); *G05B 2219/36492* (2013.01)

(58) Field of Classification Search
  USPC .......................................................... 318/560
  See application file for complete search history.

(56) References Cited

U.S. PATENT DOCUMENTS

| | | | |
|---|---|---|---|
| 9,999,954 B2* | 6/2018 | Okamoto | B23Q 17/2241 |
| 2002/0091461 A1 | 7/2002 | Yoshikawa | |
| 2007/0007924 A1* | 1/2007 | Nishihara | B25J 9/0093 |
| | | | 318/560 |

FOREIGN PATENT DOCUMENTS

| | | |
|---|---|---|
| JP | H02-279286 A | 11/1990 |
| JP | H03-218502 A | 9/1991 |
| JP | 4-40506 A | 2/1992 |
| JP | H06-71043 U | 10/1994 |
| JP | 8-241109 A | 9/1996 |
| JP | 2002-187040 A | 7/2002 |
| JP | 2011-206886 A | 10/2011 |
| JP | 2014-128843 A | 7/2014 |
| JP | 2014-157462 A | 8/2014 |

OTHER PUBLICATIONS

International Search Report issued for corresponding PCT/JP2016/056987 application.

Extended European Search Report mailed by the European Patent Office dated Mar. 28, 2018 in the corresponding European patent application No. 16772102.6-1018.

* cited by examiner

WORKPIECE LOADER DEVICE

CROSS-REFERENCE TO RELATED APPLICATIONS

This is the U.S. National Phase under 35 U.S.C. 371 of International Application No. PCT/JP2016/56987, filed on Mar. 7, 2016, which in turn claims the benefit of Japanese Patent Application No. 2015-072171, filed on Mar. 31, 2015, the disclosures of which are incorporated by reference herein.

BACKGROUND OF THE INVENTION

Field of the Invention

The present invention relates to a workpiece loader device, which supplies an unmachined workpiece to a machine tool such as a lathe, a machining center, etc., and conveys a machined workpiece from the machine tool, and more specifically, relates to an improvement of a teaching structure in order to teach a receiving position of a workpiece.

Description of the Related Art

For example, in a case in which an NC lathe or a machining center, which is provided with a gantry-type workpiece loader device, is newly installed, it is necessary to perform a teaching work to the workpiece loader device so as to teach a receiving position where a workpiece is passed to a spindle chuck of the lathe or a machining table of the machining center.

When such teaching is performed, an operator manually controls a manual pulse handle (manual pulse generator), a jog-feeding operation, etc. of an operation device, so that the loader hand is moved and positioned to the receiving position, and its position coordinates are stored in the loader device as shown in Japanese Utility Model Patent Application No. H06-71043.

However, in the conventional device as described in Japanese Utility Model Patent Application No. H06-71043, in order to determine whether or not the loader hand was precisely positioned at the receiving position with the spindle chuck, a level-type dial gauge was provided in the spindle. The operation device was controlled while the position of the workpiece held by the loader hand was confirmed by using the dial gauge. Therefore, the problems were that the dial gauge was required for the teaching, and the teaching work was required much more effort, and the teaching time took longer.

Further, in a case of the machining center, in order to determine whether or not the loader hand was precisely positioned at the receiving position with the machining table, when the workpiece was clamped in the machining table and the loader hand was moved to the position where the gripping claw of the loader hand could grab the workpiece, and when the gripping claw closed at the position, the operator required to confirm whether the loader hand was not tilted. When it was tilted, the gripping claw opened and the position of the loader hand was slightly adjusted and then, the gripping claw closed again. This operation was required repeatedly until the loader hand became not tilted. Therefore, the problems were that the teaching work was required much more effort, and the teaching time took longer.

The description herein of advantages and disadvantages of various features, embodiments, methods, and apparatus disclosed in other publications is in no way intended to limit the present invention. For example, certain features of the preferred described embodiments of the invention may be capable of overcoming certain disadvantages and/or providing certain advantages, such as, e.g., disadvantages and/or advantages discussed herein, while retaining some or all of the features, embodiments, methods, and apparatus disclosed therein.

SUMMARY OF THE INVENTION

The disclosed embodiments of the present invention have been developed in view of the above-mentioned and/or other problems in the related art. The disclosed embodiments of the present invention can significantly improve upon existing methods and/or apparatuses.

The present invention was created considering the aforementioned conventional status. An object is to provide a workpiece loader device in which a dial gauge is not required, and the teaching work can be simplified and the teaching time can be shortened.

In some embodiments of the present disclosure, a workpiece loader device includes a loader mechanism moving a loader hand, which holds a workpiece, between a workpiece storage part and a workpiece receiving position in a clamp mechanism of a machine tool; and a loader mechanism control part controlling the loader mechanism to move the loader hand to a predetermined set workpiece receiving position. It becomes possible for the loader mechanism to move the loader hand directly held by operator's hands to a desired position, and the loader mechanism control part stores position coordinates when the loader hand is moved by operator's hands to the workpiece receiving position and a completion of moving is confirmed as workpiece receiving position coordinates.

In some embodiments of the present disclosure, in the workpiece loader device as recited above, prior to moving the loader hand by operator's hands, the loader mechanism control part controls the loader mechanism to move the loader hand in a vicinity of the receiving position.

In some embodiments of the present disclosure, the workpiece loader device as recited above further includes a moving direction detection sensor detecting a moving direction of the loader hand by operator's hands. The loader mechanism control part controls the loader mechanism to generate an assisting force in the detected moving direction.

In some embodiments of the present disclosure, in the workpiece loader device as recited above, the loader mechanism control part controls the loader mechanism to generate the assisting force to stop the loader hand at any up-and-down direction position against the weight of the loader hand.

In some embodiments of the present disclosure, in the workpiece loader device as recited above, the loader mechanism control part stores position coordinates of a position as the workpiece receiving position coordinates, to which the loader hand is moved by operator's hands, at which clamping the workpiece becomes possible by the clamp mechanism, and at which the workpiece is positioned and clamped by the clamp mechanism.

According to some embodiments as recited above, in a case in which the loader mechanism control part controls the loader mechanism to move the loader hand to the predetermined workpiece receiving position coordinates, the operator directly moves the loader hand to the workpiece receiving position by hands while visually observing the position, and the position coordinates when the completion of moving is confirmed are stored as the workpiece receiving position coordinates. Therefore, there are the advantages that a dial gauge is not required, the teaching work can be simplified, and the teaching time can be shortened in comparison with the conventional operation in which the operator controls the operation device to position the workpiece held by the loader hand while confirming the position by using the dial gauge.

According to some embodiments as recited above, prior to moving the loader hand by operator's hands, the loader mechanism is controlled to move the loader hand in the vicinity of the receiving position, and therefore, the operator can complete the teaching by only moving the loader hand in a short distance by hands. Therefore, the teaching time can be shortened even more.

According to some embodiments as recited above, the assisting force is generated in the moving direction of the loader hand which is moved by operator's hands, and therefore, the loader hand can be easily moved, and the teaching work can be easily performed.

According to some embodiments as recited above, the assisting force is generated to stop the loader hand at any up-and-down direction position against its weight, and therefore, in the case in which the operator moves up and down the loader hand to direct to the receiving position, this reduces the labor burden of the operator due to the loader hand's weight. Also, from this point, the teaching work can be facilitated.

According to some embodiments as recited above, the loader mechanism control part stores the position coordinates of the position as the workpiece receiving position coordinates, at which clamping the workpiece becomes possible by the chuck, and at which the workpiece is positioned and clamped by the chuck. Therefore, the moving accuracy to the workpiece receiving position by the operator can be suppressed. Also, from this point, the teaching work can be facilitated.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/or advantages of particular embodiments should not be construed as limiting other embodiments or the claims. In the drawings, the size and relative sizes of layers and regions may be exaggerated for clarity. Like numbers refer to like elements throughout. The terminology used herein is for the purpose of describing particular embodiments only and is not intended to be limiting of the invention. As used herein, the singular forms "a", "an" and "the" are intended to include the plural forms as well, unless the context clearly indicates otherwise. As used herein, the term "and/or" includes any and all combinations of one or more of the associated listed items and may be abbreviated as "/". It will be understood that, although the terms first, second, etc. may be used herein to describe various elements, these elements should not be limited by these terms. Unless indicated otherwise, these terms are only used to distinguish one element from another. For example, a first object could be termed a second object, and, similarly, a second object could be termed a first object without departing from the teachings of the disclosure. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. It will be understood that when an element is referred to as being "connected" or "coupled" to or "on" another element, it can be directly connected or coupled to or on the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.). However, the term "contact," as used herein refers to direct contact (i.e., touching) unless the context indicates otherwise. Terms such as "same," "planar," or "coplanar," as used herein when referring to orientation, layout, location, shapes, sizes, amounts, or other measures do not necessarily mean an exactly identical orientation, layout, location, shape, size, amount, or other measure, but are intended to encompass nearly identical orientation, layout, location, shapes, sizes, amounts, or other measures within acceptable variations that may occur, for example, due to manufacturing processes. The term "substantially" may be used herein to reflect this meaning. Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

DETAILED DESCRIPTION

In the following paragraphs, some embodiments of the invention will be described by way of example and not limitation. It should be understood based on this disclosure that various other modifications can be made by those in the art based on these illustrated embodiments.

Hereinafter, embodiments of the present invention will be described in reference to the drawings.

[Embodiment 1]

FIGS. 1 to 5 are the illustrations to describe the workpiece loader device according to embodiment 1 of the present invention.

In the drawing, reference numeral 1 denotes a workpiece loader device according to embodiment 1. The workpiece loader device 1 is provided with a loader mechanism 4 which moves a loader hand 2 holding a workpiece W between a workpiece storage part WS and a workpiece receiving position on a workpiece table 3 of the machine tool, and a loader mechanism control part 5 which controls the loader mechanism 4 so as to move the loader hand 2 to a predetermined workpiece receiving position.

Figure 1:
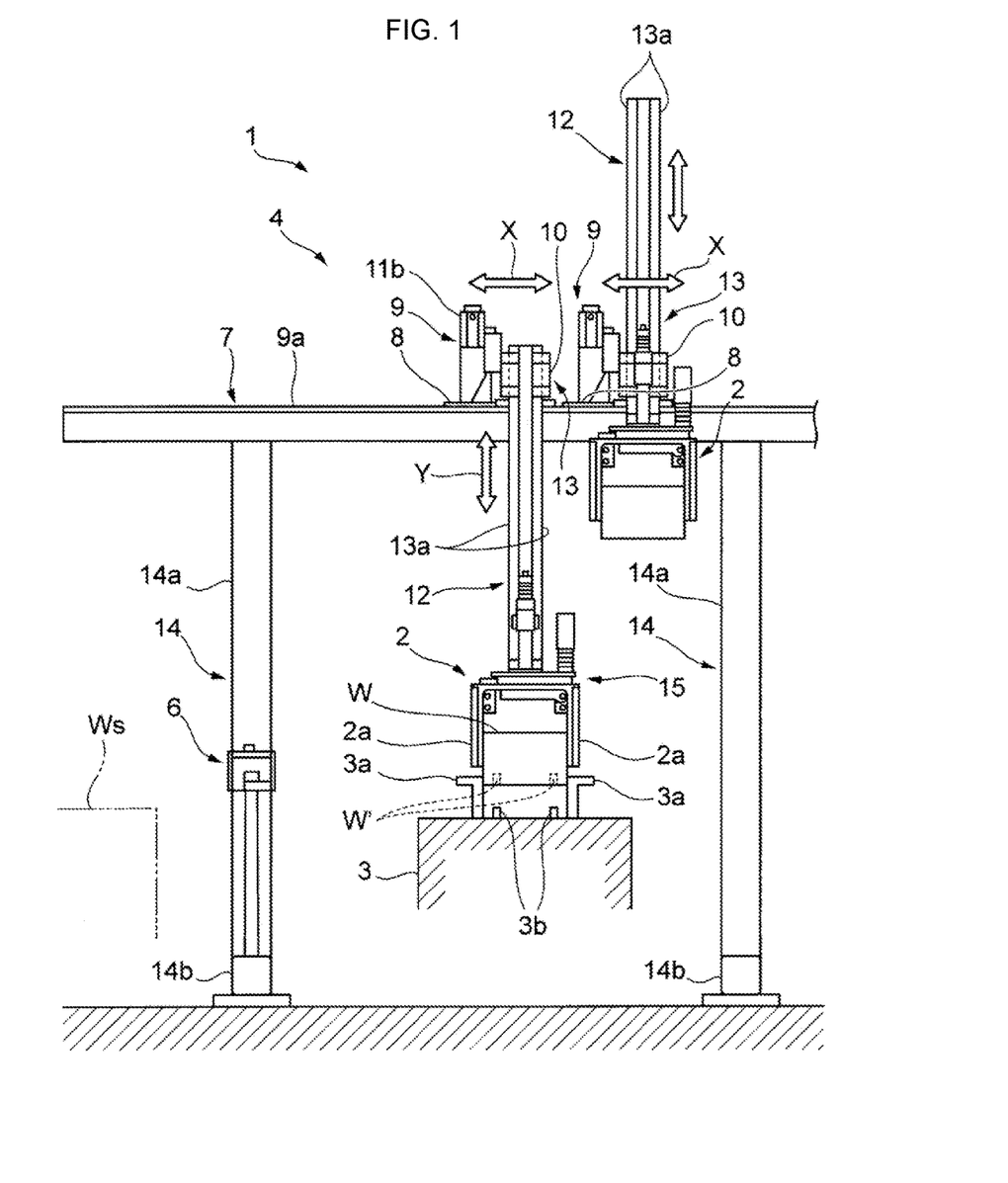
FIG. 1 is a front view showing a workpiece loader device according to embodiment 1 of the present invention.
Figure 3:
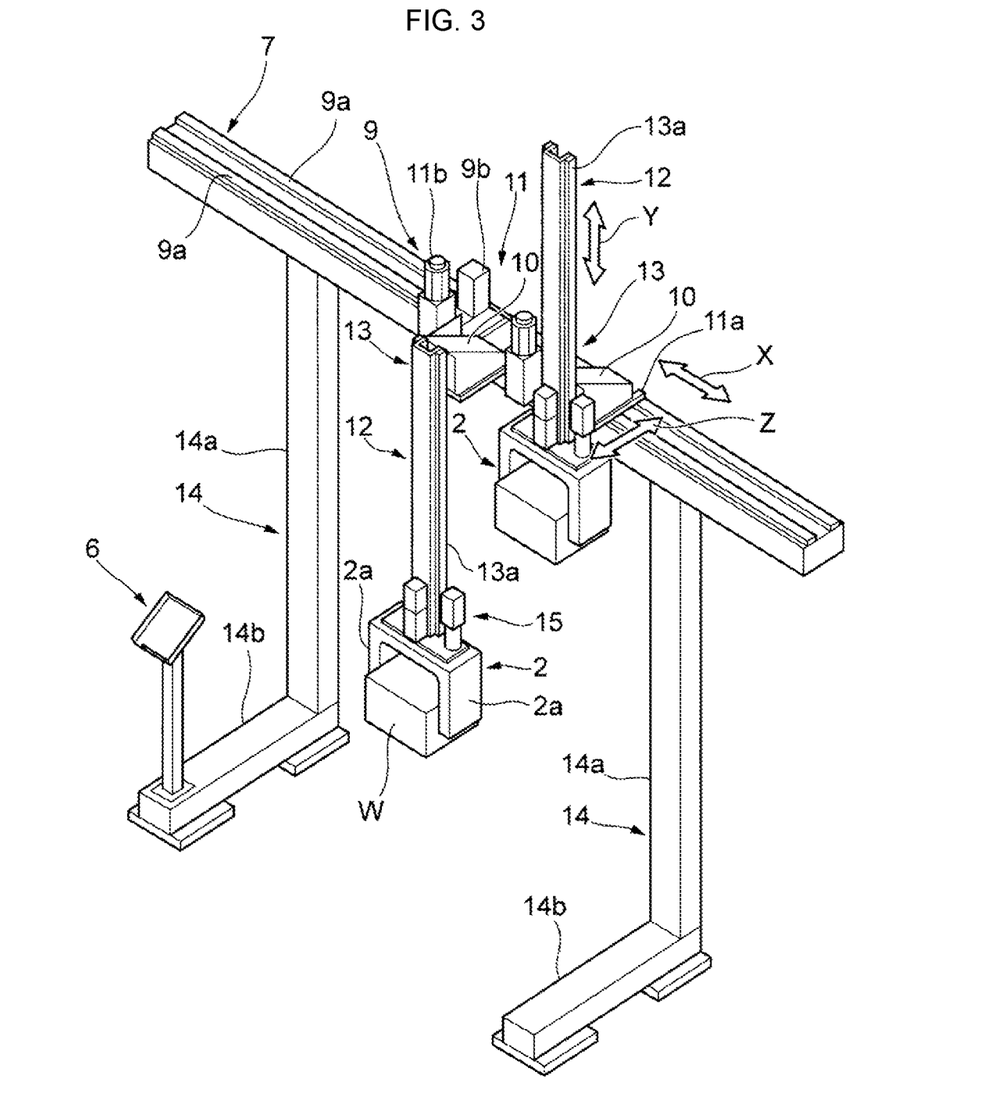
FIG. 3 is a front perpendicular view of the workpiece loader device.

In the workpiece table 3, a plurality of positioning pins 3b, 3b are provided for positioning a workpiece W. Further, in the workpiece table 3, clamp claws 3a, 3a are arranged to clamp the workpiece after being positioned.

Here, in a case of embodiment 1, the workpiece receiving position means a position where the position pins 3b, which are provided on the workpiece table, are engaged with the positioning holes W' of the workpiece W, and clamping the workpiece W becomes possible by the clamp claws 3a, 3a. It is represented by X, Y, Z coordinates value.

Figure 2:
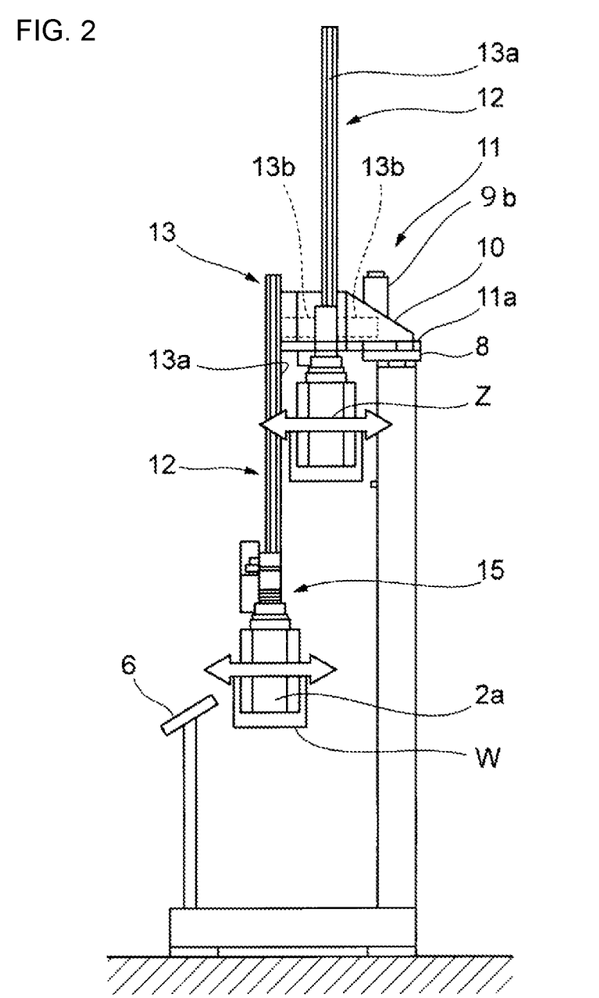
FIG. 2 is a side view of the workpiece loader device.

The loader mechanism 4 has a loader beam 7 which extends in an X-axis direction (traveling direction), and a carrier 8 is mounted on the loader beam 7 so as to travel in the X-axis direction. The carrier 8 is driven forward and backward in the X-axis direction by an X-axis driving mechanism 9. Further, a saddle 10 is movably mounted on the carrier 8 in a Z-axis direction (front and back direction), and the saddle 10 is driven forward and backward in the Z-axis direction by a Z-axis driving mechanism 11. Further, a hand arm 12 is movably mounted on the saddle 10 in a Y-axis direction (up and down direction), and the hand arm 12 is driven vertically in the Y-axis direction by a Y-axis driving mechanism 13. The loader hand 2 is arranged in the lower end part of the hand arm 12, and the loader hand 2 is driven to open and close by a loader hand opening and closing driving mechanism 15.

The loader beam 7 is fixedly supported on a machine installation surface by L-shaped legs 14, 14 which have vertical side portions 14a and horizontal side portions 14b. An operation panel 6 which manually operates the loader mechanism 4 is arranged in the horizontal side portion 14b.

Figure 4:
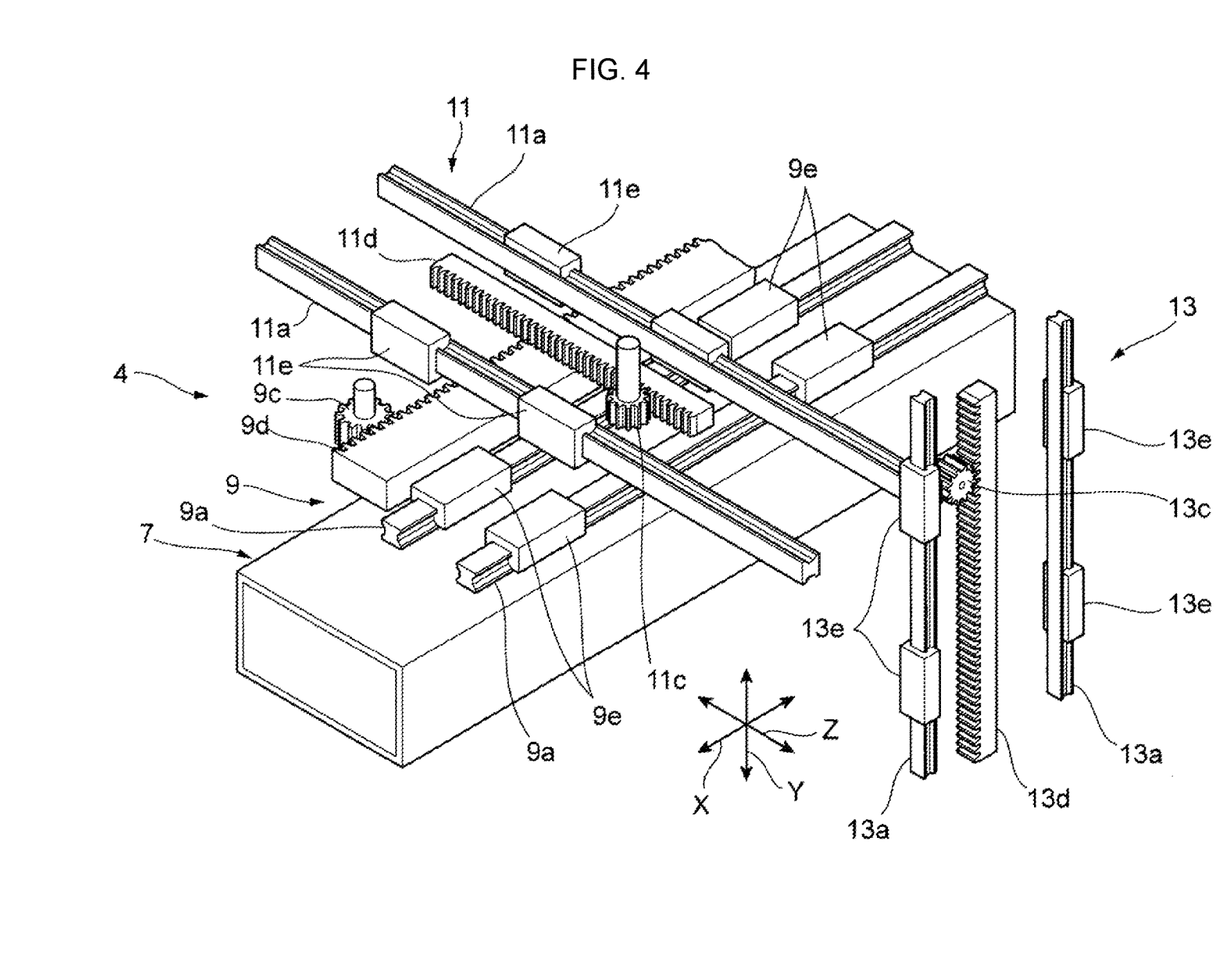
FIG. 4 is a front perpendicular view of a driving mechanism part of the workpiece loader device.

In FIG. 4, in order to simplify the structure of each of the driving mechanisms 9, 11, 13, the illustrations of the carrier 8, the saddle 10, and the hand arm 12 are omitted.

In the X-axis driving mechanism 9, the carrier 8 is movably supported in the X-axis direction through four sliders 9e by X-axis guide rails 9a, 9a which are fixed in the loader beam 7. A pinion gear 9c fixed in the output shaft of an X-axis driving motor 9b, which is mounted in the carrier 8, meshes with a rack 9c fixed in the loader beam 7. The carrier 8 moves forward and backward in the X-axis direction by the forward and reverse rotation of the X-axis driving motor 9b.

In the Z-axis driving mechanism 11, the saddle 10 is movably supported in the Z-axis direction through four sliders 11e by Z-axis guide rails 11a, 11a fixed in the carrier 8. A pinion gear 11c fixed in the output shaft of the Z-axis driving motor 11b, which is mounted in the saddle 10, meshes with a rack 11d fixed in the carrier 8. The saddle 10 moves forward and backward in the Z-axis direction by the forward and reverse rotation of the Z-axis driving motor 11b.

In the Y-axis driving mechanism 13, the hand arm 12 is movably supported in the Y-axis direction by the saddle 10 through the slider 13e fixed in a Y-axis guide rail 13b and the saddle 10. A pinion gear 13c fixed in the output shaft of the Y-axis driving motor 13b, which is arranged in the saddle 10, meshes with a rack 13d fixed in the hand arm 12. The hand arm 12 moves up and down in the Y-axis direction by the forward and reverse rotation of the Y-axis driving motor 13b.

The loader hand 2 has a pair of the gripping claws 2a, 2a, and the distance between the gripping claws 2a, 2a which are faced each other is changeable by the loader hand opening and closing driving mechanism 15. Therefore, with such configuration, it is possible to hold the workpiece W.

Figure 5:
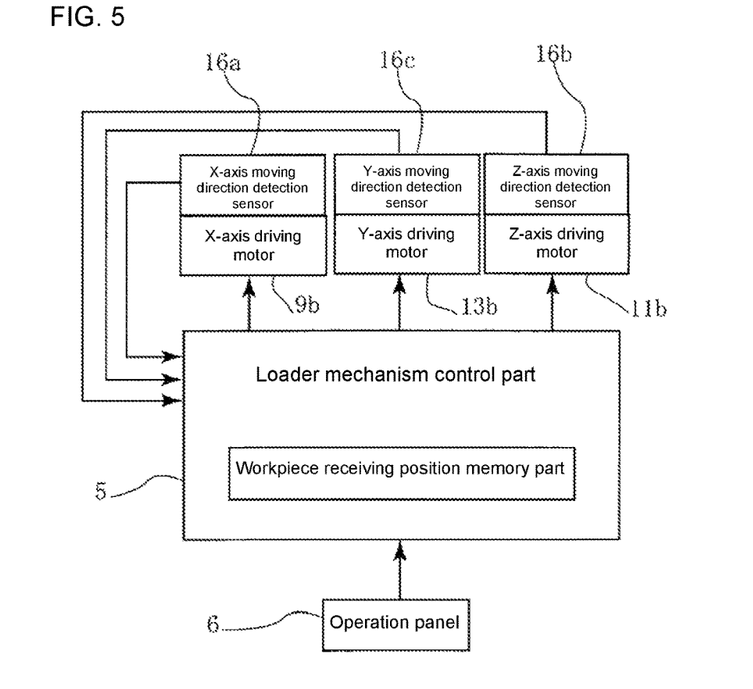
FIG. 5 is a block diagram of a loader mechanism control part of the workpiece loader device.

In the loader mechanism 4, when an operation mode is switched to a workpiece receiving position teaching mode, which will be described later, by controlling the operation panel 6, the operator can directly move the loader hand 2 to a predetermined position by hands. Further, the X-axis driving motor 9b, the Y-axis driving motor 13b, and the Z-axis driving motor 11b are respectively provided with an X-axis moving direction detection sensor 16a, a Z-axis moving direction detection sensor 16b, and a Y-axis moving direction detection sensor 16c so as to detect a moving direction of the loader hand 2 moved by operator's hands.

In the loader mechanism control part 5, it is possible to switch between a workpiece receiving mode and a workpiece receiving position teaching mode. In the workpiece receiving mode, the loader mechanism 4 controls the loader hand 2 to move to the predetermined workpiece receiving position.

In the workpiece receiving position teaching mode, the loader mechanism control part 5 controls the loader mechanism 4 as described below.

Further, in the teaching mode, it is possible to switch between a moving mode by the operation device and a moving mode by operator's hands. First, prior to the process in which the operator moves the loader hand 2 by operator's hands, in the moving mode by the operation device, the loader mechanism control part 5 controls the loader mechanism 4 to move the loader hand 2 in the vicinity of the receiving position.

When the operator switches to the moving mode by operator's hands and the loader hand 2 is moved to the workpiece receiving position by operator's hands, the moving direction and the X, Y, Z coordinates position are detected by the X-axis, Y-axis, Z-axis moving direction detection sensors, and the detected moving direction and the X, Y, Z coordinates position are inputted to the loader mechanism control part 5. Then, the loader mechanism control part 5 controls the loader mechanism 4 to generate an assisting force in the detected moving direction of the loader hand. For example, in a case in which the loader hand 2 moves in the X-axis direction, an electric current is supplied to the X-axis driving motor 9b of the X-axis driving mechanism 9 in order to generate a driving power which equals to the friction resistance force of rack and pinion mechanisms, etc. in the moving direction. Further, regarding an assisting force of the Y-axis direction, an electric current is supplied to generate the assisting force so that it becomes possible for the loader hand 2 to be always stopped at any position in the up-and-down direction against its weight.

In the loader mechanism control part 5, the X, Y, Z coordinates position are read due to the operator moves the loader hand 2 to the workpiece receiving position by operator's hands. At the point in which the positioning holes W' of the workpiece W are engaged with the positioning pins 3b of the workpiece table 3 and the clamp claws 3a become possible to hold the workpiece W, when the operator confirms the completion of moving process by the operation panel 6, the X, Y, Z coordinates position of the loader hand 2 are stored as the workpiece receiving position coordinates.

In the normal workpiece loader process, the loader mechanism control part 5 controls the loader mechanism 4 so as to position the workpiece W at the stored workpiece receiving position coordinates by the loader hand 2.

As described above, in the present embodiment, in the case in which the loader mechanism control part 5 controls the loader mechanism 4 to move the loader hand 2 in predetermined workpiece receiving position coordinates, the position coordinates, where the operator directly moves the loader hand 2 by hands to the workpiece receiving position while visually observing the position and confirms the completion of moving, are stored as the workpiece receiving position coordinates. Therefore, there are the advantages that the teaching work can be simplified and the teaching time can be shortened in comparison with the conventional operation.

Further, prior to the process in which the operator moves the loader hand 2 by hands, the loader mechanism 4 is controlled to move the loader hand 2 to the vicinity of the receiving position, so that the operator can complete the teaching by only moving the loader hand 2 in a short distance by hands. Therefore, the teaching time can be shortened even more.

Further, it is configured to generate the assisting force in a direction to which the operator moves the loader hand 2 by hands, and therefore, the operator can move the loader hand 2 lightly and the teaching work can be easily performed.

Furthermore, regarding the assisting force of the Y-axis direction (up-and-down direction), the assisting force is generated to stop the loader hand 2 at any up-and-down direction position against its weight. Therefore, in the case in which the operator moves up and down the loader hand 2 to direct the receiving position, this reduces the labor burden of the operator due to the loader hand's weight. Also, from this point, the teaching work can be facilitated.

[Embodiment 2]

In embodiment 1, the X, Y, Z coordinates in the state in which the positioning pins 3*b* of the workpiece table 3 are engaged with the positioning holes W' of the workpiece W is defined as the workpiece receiving position coordinates, but the workpiece receiving position coordinates of the present invention are not limited to them.

Figure 6:
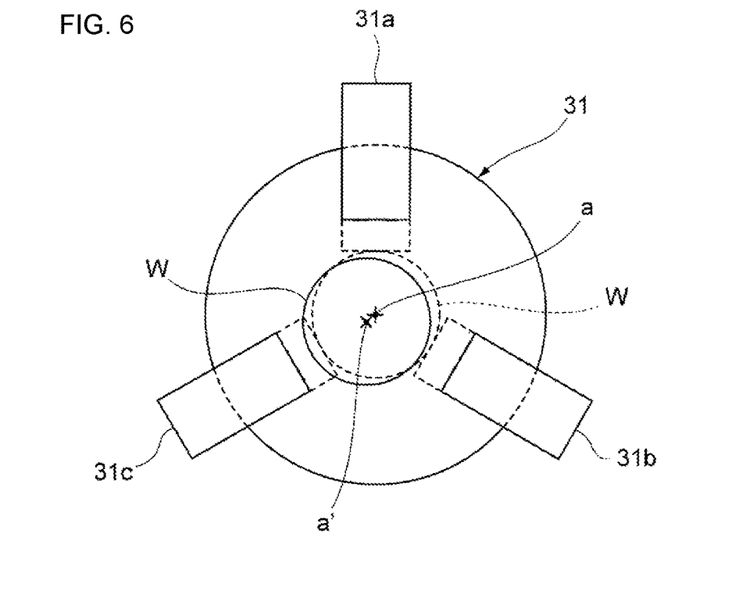
FIG. 6 is a front view showing a spindle chuck according to embodiment 2 of the present invention.

FIG. 6 is an illustration showing embodiment 2 in a case in which a workpiece is received in a chuck (clamp mechanism) 31 mounted in a spindle of a lathe. The chuck 31 has three clamp claws 31*a*, 31*b*, 31*c* which are arranged at equal angle interval and are movable in a radial direction. Even if the workpiece W is set in a position shifted from the shaft center a of the spindle within the region (position where it is possible to clamp) surrounding by the three clamp claws 31*a* to 31*c* (see the solid line in FIG. 6), it is configured to automatically adjust the position of the workpiece W to the center, which corresponds to the shaft center a of the spindle, by the clamp claws 31*a* to 31*c* (see the broken line in FIG. 6).

In embodiment 2 when the operator moves the loader hand 2 by hands in order to move the workpiece W in a position within the region surrounding by the clamp claws 31*a* to 31*c* of the chuck 31, and when the workpiece W is clamped by the chuck 31, the clamp claws 31*a* to 31*c* automatically adjust the shaft center a' of the workpiece W to correspond with the shaft center a of the spindle, and it is clamped. At the point in which the workpiece W is clamped, the loader mechanism control part 5 stores the X, Y, Z coordinates as the workpiece receiving position coordinates.

In embodiment 2, at the point in which the workpiece W is moved to the position where the chuck 31 becomes possible to clamp the workpiece W, and the workpiece W is positioned and clamped by the chuck 3, the position coordinates are stored as the workpiece receiving position coordinates. Therefore, there are the advantages in which the dial gauge is not required for the teaching work in comparison with the conventional operation in which the operator controls the operation device while confirming the position of the workpiece W, which is held by the loader hand, by using the dial gauge. Further, the teaching work can be simplified and the teaching time can be shortened.

The terms and descriptions used herein are used only for explanatory purposes and the present invention is not limited to them. Accordingly, the present invention allows various design-changes falling within the claimed scope of the present invention.

While the present invention may be embodied in many different forms, a number of illustrative embodiments are described herein with the understanding that the present disclosure is to be considered as providing examples of the principles of the invention and such examples are not intended to limit the invention to preferred embodiments described herein and/or illustrated herein.

While illustrative embodiments of the invention have been described herein, the present invention is not limited to the various preferred embodiments described herein, but includes any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to." In this disclosure and during the prosecution of this application, the terminology "present invention" or "invention" is meant as a non-specific, general reference and may be used as a reference to one or more aspects within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features.

What is claimed is:

1. A workpiece loader device comprising:
   a loader mechanism moving a loader hand, which holds a workpiece, between a workpiece storage part and a workpiece receiving position in a clamp mechanism of a machine tool; and
   a loader mechanism control part controlling the loader mechanism to move the loader hand to a predetermined workpiece receiving position,
   wherein the loader mechanism is configured to move the loader hand directly held by operator's hand to a desired position, and the loader mechanism control part stores position coordinates when the loader hand is moved by operator's hand to the workpiece receiving position and a completion of moving is confirmed as workpiece receiving position coordinates, and
   wherein the loader mechanism control part stores position coordinates of a position before clamping the workpiece as the workpiece receiving position coordinates, to which the loader hand is moved by operator's hands, at which clamping the workpiece becomes possible by the clamp mechanism, and at which the workpiece is positioned and clamped by the clamp mechanism.

2. The workpiece loader device according to claim 1, wherein prior to moving the loader hand by operator's hands, the loader mechanism control part controls the loader mechanism to move the loader hand in a vicinity of the receiving position.

3. The workpiece loader device according to claim 1, further comprising: a moving direction detection sensor detecting a moving direction of the loader hand by operator's hands,
  wherein the loader mechanism control part controls the loader mechanism to generate an assisting force in the detected moving direction.

4. The workpiece loader device according to claim 3, wherein the loader mechanism control part controls the loader mechanism to generate the assisting force to stop the loader hand at any up-and-down direction position against a weight of the loader hand.

* * * * *